United States Patent
Andersson et al.

[15] 3,671,050
[45] June 20, 1972

[54] CHUCKS

[72] Inventors: Ake Paul Andersson; Per Augustin Wegmar, both of Karlskoga, Sweden

[73] Assignee: Aktiebolaget Bofors, Bofors, Sweden

[22] Filed: March 11, 1970

[21] Appl. No.: 18,658

[30] Foreign Application Priority Data

March 24, 1969 Sweden.................................4100/69

[52] U.S. Cl. ..................................279/47, 90/11 A, 279/51
[51] Int. Cl..........................................................B23b 31/04
[58] Field of Search........................279/1 A, 1 B, 1 T, 42, 51, 279/52, 53, 89, 90, 91, 43, 46, 47, 48; 90/11 A

[56] References Cited

UNITED STATES PATENTS 3,332,693  7/1967  Armstrong et al. ...................279/91 X
2,719,722  10/1955  Nickless...................................279/91
3,365,204  1/1968  Benjamin et al..........................279/51

Primary Examiner—Andrew R. Juhasz
Assistant Examiner—James F. Coan
Attorney—Hane, Baxley and Spiecens

[57] ABSTRACT

A chuck for holding a tool comprises a chuck support having a conical recess which accepts a conical clamping sleeve. A clamping nut carrying a freely rotatable ring is threaded onto the chuck support. The ring has means for engaging the chuck support in such a way to permit relative axial movement therebetween but no relative rotational movement. Shoulders on the clamping sleeve and the ring are so arranged that in one relative position axial movement therebetween is blocked while in another relative position the clamping sleeve can pass through the ring.

2 Claims, 3 Drawing Figures

PATENTED JUN 20 1972 3,671,050

INVENTORS
PER AUGUSTIN WEGMAR
ÅKE PAUL ANDERSSON
BY Hane, Baxley and
Spiecens
ATTORNEYS

CHUCKS

The present invention relates to a chuck to be used e.g. for milling tools and comprising a chuck support provided with a clamping nut in engagement with an externally threaded portion of the support for holding a resilient, conical clamping sleeve positioned in the support.

In order for such a chuck to be useful for holding tools, such as shank-end mills, having shanks of different diameters, it is necessary for the clamping sleeve to be replaceable. Prior art chucks of the type here under discussion suffer from the disadvantage that exchange of the clamping sleeve can take place only after the clamping nut has been completely screwed off from the support, the ground for this being that the transverse dimension of the sleeve does not permit passage of the sleeve through the end orifice of the nut. The same limitation is present when the chuck is used without a clamping sleeve, in which case the tool is accordingly mounted in direct contact with the chuck support. That type of mounting is used when the mechanical load is considerable or when the requirements for accurate centering of the tool are especially critical. Consequently, also in such cases it has before this invention was made been necessary completely to remove the clamping nut each time the tool should be inserted in or removed from the chuck.

The main object of the invention is to provide a chuck of such a construction that the drawbacks above referred to are eliminated.

A further object of the invention is to provide a chuck which renders itself for use in modern fast-production machine tools in that it offers a reliable tool hold but yet is easy to operate.

The above and other objects and advantages of the invention will become apparent from the following description, reference being made to the accompanying drawing illustrating by way of example two embodiments of the invention.

Figure 1:
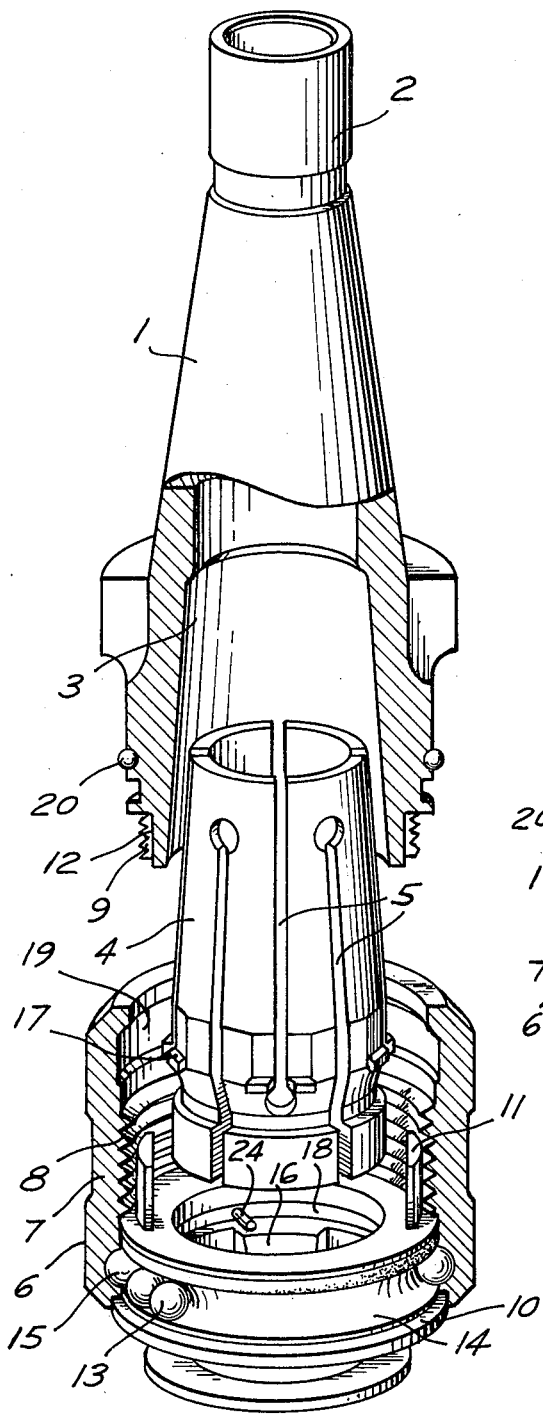
FIG. 1 is a part-sectional exploded perspective view showing a chuck comprising a clamping sleeve.
Figure 2:
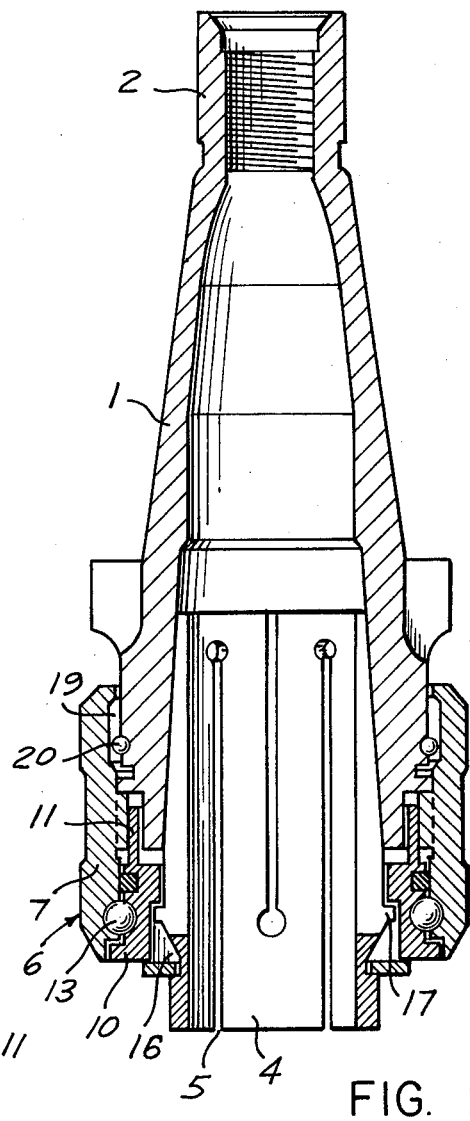
FIG. 2 is an axial cross-section of the chuck shown in FIG. 1, the device being here illustrated in assembled form.

In FIGS. 1 and 2 reference numeral 1 refers to a chuck support to be mounted in a machine tool, e.g. a milling machine, and for that purpose having its external surface tapered towards the one end which forms a sleeve 2 having internal threads. The front portion of the chuck support has a conical space 3 for receiving a clamping sleeve 4 the outer surface of which is conical. The wall of sleeve 4 is, in a manner known per se, longitudinally slotted, the slots running alternately from the one or the other end of the sleeve which in this way is made radially resilient so that it, when exposed to clamping forces, can securely hold a tool, having its shank portion inserted into the sleeve. Clamping of the sleeve 4 in the chuck support 1 is attained by means of a clamping nut, generally designated 6, and comprising a rear portion 7 having internal threads 8 for engagement with corresponding external threads 9 on the front end portion of the chuck support, and a front annular portion 10, the two parts of the nut being rotatable in respect of each other. Ring 10 has a pair of diametrally oppositely located, axially projecting tongues 11 received in axially extending guiding grooves 12 in the front threaded part of the chuck support. Tongues 11 and grooves 12 serve to prevent ring 10 from being rotated relatively to the chuck support 1 while simultaneously permitting relative axial displacement between those parts. The threaded part 7 of the clamping nut is connected to ring 10 be means of a number of balls 13 located in two circumferential grooves 14 and 15 in ring 10 and in nut portion 7, respectively. As is understood, this mounting means that nut portion 7 is prevented from axial movement relatively to ring 10 but may freely rotate in respect of the latter. Consequently, when nut portion 7 is screwed onto chuck support 1, ring 10 will participate in the axial movement of the nut but maintain its angular position in relation to the nut.

In accordance with a further characteristic of the invention ring 10 is also provided with a number of shoulders 16 projecting radially inwards from its wall and designed to cooperate with a corresponding number of radially outwardly projecting shoulders 17 carried by clamping sleeve 4. As can most clearly be seen from FIG. 1, each shoulder 17 of the clamping sleeve 4 consists of two parts located on opposite sides of one of the slots 5. The circumferential extension of each of shoulders 16 and 17 is selected so that, when shoulders 17 on sleeve 4 are positioned opposite the recesses formed between shoulders 16 in ring 10, axial displacement of clamping sleeve 4 through ring 10 is permitted. When a mounted tool is to be released, clamping sleeve 4 is withdrawn from the chuck support 1 in the way that shoulders 17 carried by the sleeve are brought into engagement with a groove 18 located behind shoulders 16, as seen in an axial direction. Groove 18 is formed in ring 10 and preferably continuous in the circumferential direction. When the clamping nut 6 is rotated in such a direction that its resulting axial movement is directed towards the free end of the chuck, nut portion 7 will displace ring 10 axially outwardly. Due to the engagement between on the one hand shoulders 17 on the clamping sleeve 4 and, on the other, groove 18 in ring 10 the clamping sleeve 4 will then be retracted from the chuck support 8 thus permitting replacement of the tool or of the sleeve, or of both as the case may be. In order to make sure that, when the chuck is tightened, the two sets of shoulders 16 and 17 will assume their correct relative angular positions suitable guiding or fixation means can be used, such as, in the embodiment here illustrated, a locking pin 24 which projects into groove 18 from a radial bore in the ring 10.

The chuck does also have a blocking device intended positively to prevent the clamping nut 6 from being completely screwn off the chuck support 1. This blocking device is formed by an internal groove 19 in the nut portion 7 and by a number of blocking balls 20 engaging on the one hand groove 19 and, on the other, a circumferential groove in chuck support 1. The width, or axial dimension, of groove 19 is selected inferior to that of the threaded portions 8 and 9 to ensure that the blocking action will be realized.

Figure 3:
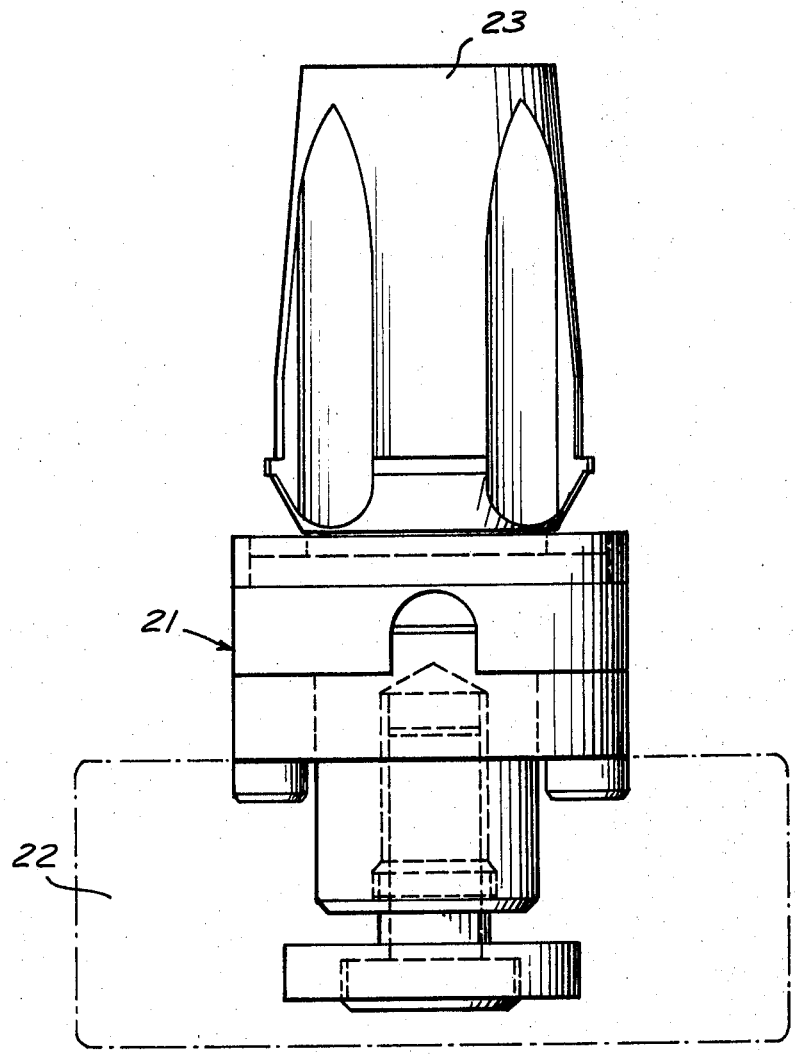
FIG. 3 is a lateral view showing a milling tool the diameter of which considerably exceeds the diameter of the orifice in the clamping nut, the tool being intended for direct mounting in a chuck without any intermediate sleeve.

According to the embodiment of the invention illustrated in FIG. 3 the milling tool 21 comprises a portion 22 equipped with the cutting edges of the tool and marked diagrammatically by dashed lines, and a shaft portion 23 tapered into general agreement with the external shape of the clamping sleeve 4 shown in FIGS. 1 and 2. Thanks to this configuration no clamping sleeve is necessary and the tool may consequently be mounted directly in the chuck without any intermediate sleeve. One practical advantage of this mounting is that the clamping force of the chuck is highly increased.

We claim:

1. A chuck for holding a tool comprising a conical clamping sleeve, said clamping sleeve being resilient and having at one end thereof angularly spaced shoulders, a chuck support, said chuck support being provided with an internal conical recess for accepting said clamping sleeve and having an external thread, a clamping nut, said clamping nut having an internal thread engaging the external thread of said chuck support whereby said clamping nut is threaded onto said chuck support, a ring mounted in said clamping nut, said ring being freely rotatable with respect to said clamping nut but axially fixed thereto, first shoulder means on said ring for rotationally fixing said ring to said chuck support while permitting axial displacement therebetween, second shoulder means angularly spaced about said ring and arranged when in alignment with said shoulders of said clamping sleeve to block relative axial movement between said ring and said clamping sleeve whereby the axial movement of said clamping sleeve follows the axial movement of said clamping nut and further arranged so that when out of alignment with said shoulders of said clamping sleeve axial movement of said clamping sleeve is permitted whereby said clamping sleeve carrying a tool can pass through said ring.

2. The chuck of claim 1 further comprising means for preventing the complete unthreading of said clamping nut from said chuck support.

* * * * *